US012263946B2

(12) United States Patent
Esau et al.

(10) Patent No.: US 12,263,946 B2
(45) Date of Patent: Apr. 1, 2025

(54) INSTALLMENT SYSTEM FOR OVERHEAD BINS

(71) Applicant: Textron Aviation Inc., Wichita, KS (US)

(72) Inventors: Nathan Earl Esau, Wichita, KS (US); Jonathan Lynn Headrick, Peck, KS (US)

(73) Assignee: Textron Innovations Inc., Providence, RI (US)

( * ) Notice: Subject to any disclaimer, the term of this patent is extended or adjusted under 35 U.S.C. 154(b) by 196 days.

(21) Appl. No.: 18/056,892

(22) Filed: Nov. 18, 2022

(65) Prior Publication Data

US 2023/0159170 A1 May 25, 2023

Related U.S. Application Data (60) Provisional application No. 63/281,222, filed on Nov. 19, 2021.

(51) Int. Cl.
  *B64D 11/00* (2006.01)
  *B64C 1/06* (2006.01)

(52) U.S. Cl.
  CPC .......... *B64D 11/003* (2013.01); *B64C 1/066* (2013.01)

(58) Field of Classification Search
  CPC .......... B64D 11/003; B64D 2011/0046; B64C 1/066
  See application file for complete search history.

(56) References Cited

U.S. PATENT DOCUMENTS

| 3,666,214 | A |  | 5/1972 | Matuska |
| 5,108,048 | A | * | 4/1992 | Chang ................. B64D 11/003 244/118.1 |
| 5,842,668 | A |  | 12/1998 | Spencer |
| 6,769,831 | B2 |  | 8/2004 | Aquino et al. |
| 8,776,353 | B2 | * | 7/2014 | Herzog ................ B64D 11/003 244/129.5 |
| 9,169,019 | B2 |  | 10/2015 | Costabel |
| 10,569,879 | B2 | * | 2/2020 | Schneider ................ B64C 1/22 |
| 2012/0074258 | A1 | * | 3/2012 | Papke .................. B64D 11/003 244/118.5 |
| 2012/0156420 | A1 | * | 6/2012 | Greiner ................... B64C 1/066 428/101 |

FOREIGN PATENT DOCUMENTS

EP  3254967 A1 * 12/2017 ........... B64D 11/003

* cited by examiner

*Primary Examiner* — Joshua J Michener
*Assistant Examiner* — Arfan Y. Sinaki
(74) *Attorney, Agent, or Firm* — Avek IP, LLC (57) ABSTRACT

An overhead bin in an aircraft includes a liner disposed on an underside of a cabin ceiling and a receptacle that protrudes through an opening in the liner. A bin has a top side with at least one attachment point that includes: a stud mechanically coupled to the top side and a screw disposed within the stud. The stud includes a rounded flange configured to insert into the receptacle for removably securing the bin beneath the liner. An installation method for an overhead bin in an aircraft includes raising the overhead bin to engage the stud with the receptacle, sliding the overhead bin outboard for inserting the stud into the receptacle, and turning a screw within the stud for tightening the stud within the receptacle for securing the overhead bin beneath the ceiling.

14 Claims, 7 Drawing Sheets

INSTALLMENT SYSTEM FOR OVERHEAD BINS

CROSS-REFERENCE TO RELATED APPLICATIONS

This application claims the benefit of priority of U.S. Provisional Patent Application No. 63/281,222 entitled Quick Installation and Removal of Overhead Bins and filed on Nov. 19, 2021, the disclosure of which is herein incorporated by reference in its entirety.

BACKGROUND OF THE INVENTION

1. Field

The disclosed embodiments relate generally to storage components. More specifically, the embodiments relate to easily installable and removable overhead bins for aircraft.

2. Description of the Related Art

Removable overhead stowage bins for use in aircraft are known. For example, U.S. Pat. No. 9,169,019 to Costabel discloses a fastening system having a first bracket that attaches to an overhead storage bin, a second bracket that attaches to a supporting structure, a pin that connects the first and second brackets, and a spring to lock the pin in place. U.S. Pat. No. 6,769,831 to Aquino et al. discloses a quick-disconnect fastener assembly for installing stowage bins having a tubular connector that engages a pin; the tubular connector can be rotated in a first direction to lock the pin and in the opposite direction to unlock the pin. U.S. Pat. No. 5,842,668 to Spencer discloses a quick fit overhead stowage compartment having one hook and two clevis fittings on each end of a stowage bin that are fastened with a tie rod. U.S. Pat. No. 3,666,214 to Matuska discloses quickly removable storage bins having a snubber pivotably connected at an upper end to the storage bin and at a lower end to a lever, with the lever and the snubber being connected to a pivot pin.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an installment system for an overhead bin in an aircraft includes: a liner disposed on an underside of a cabin ceiling of the aircraft; a receptacle mechanically coupled to a structure above the cabin ceiling via a bracket, wherein the receptacle protrudes through an opening in the liner; a bin having a top side with at least one attachment point, the at least one attachment point including: a stud mechanically coupled to the top side; and a screw disposed within the stud, wherein the stud includes a rounded flange configured to insert into the receptacle for removably securing the bin beneath the liner.

In another embodiment, an installation method for an overhead bin in an aircraft is provided, wherein the overhead bin includes at least one stud on a top side of the overhead bin and a ceiling of the aircraft includes at least one receptacle, the installation method includes: raising the overhead bin to engage the at least one stud with the at least one receptacle; sliding the overhead bin in an outboard direction for inserting the at least one stud into a narrow portion of the at least one receptacle; and turning a screw disposed within the at least one stud in a first direction for increasing a tension within the at least one receptacle, thereby securing the overhead bin beneath the ceiling.

In yet another embodiment, a removable overhead bin for use in an aircraft includes: a plurality of brackets mounted to an overhead structure above a ceiling in the aircraft; a liner disposed on an underside of the ceiling, wherein the liner includes a finished surface visibly exposed inside the aircraft; a plurality of receptacles each mechanically coupled to a respective one of the brackets, wherein the liner includes a plurality of openings configured to each receive a respective one of the receptacles for protruding through the liner; and a removable bin having a top side with a plurality of attachment points, each of the attachment points including: a stud mechanically coupled to the top side, wherein the stud includes an exposed end having a larger diameter configured for inserting into a respective one of the receptacles; and a screw disposed within the stud, wherein the screw is configured for turning thereby tightening the stud within the receptacle for removably securing the removable bin beneath the liner.

BRIEF DESCRIPTION OF THE SEVERAL VIEWS OF THE DRAWINGS

Illustrative embodiments are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments are generally directed to an installment system for a removable overhead bin. The overhead bin may be used in aircraft and installed beneath the ceiling in the cabin for forming an overhead storage area. The overhead bin may comprise a plurality of attachment points for installing into the ceiling area. Each attachment point may comprise a stud connected to the overhead bin, a receptacle disposed in the overhead storage area, and a screw. The studs and the receptacles may be configured to carry substantially all the loads imparted onto the overhead bin. For installation, the overhead bin may be raised and slid in an outboard direction to insert the stud with the receptacle. Each stud may then be secured with the screw (e.g., via a screwdriver). By providing a quick and easy installation method that requires the use of a single tool, the aircraft may be adaptable to varying use cases. If less weight and more overhead space are desired, the overhead bins may be quickly removed to reduce weight and increase overhead cabin space even for an individual trip.

Figure 1:
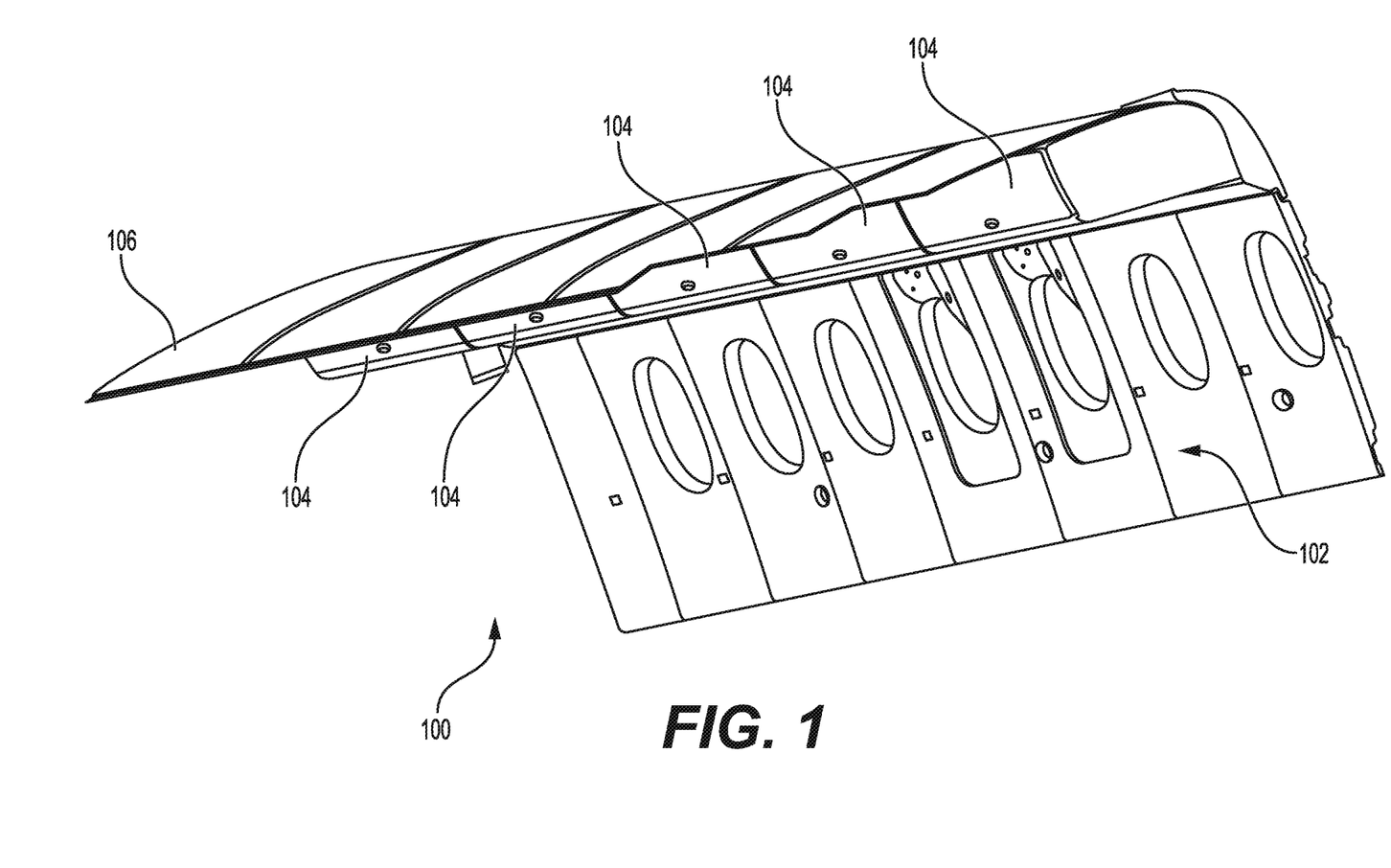
FIG. 1 illustrates an aircraft cabin comprising overhead bins installed above a seating area for some embodiments.

FIG. 1 illustrates a portion of an aircraft cabin 100 for some embodiments. Not all portions of aircraft cabin 100 are shown in FIG. 1 for clarity of illustration. As shown, aircraft cabin 100 may comprise a seating region 102 adjacent windows, which may comprise seats, couches, tables, consoles, and/or benches (not shown). Above seating region 102, overhead bins 104 may be installed. As illustrated, in some embodiments, aircraft cabin 100 may be configured for five overhead bins 104 to be installed on a side of aircraft cabin 100. Broadly, any number of overhead bins 104 may be installed into aircraft cabin 100. In some embodiments, overhead bins 104 are configured to store luggage, supplies, and the like.

Aircraft cabin 100 may also comprise liner 106. Liner is disposed on an underside of the ceiling in aircraft cabin 100. In some embodiments, liner 106 is disposed on the interior ceiling and wall panels. When overhead bins 104 are installed, liner 106 may be disposed substantially above and curve behind the overhead bins 104. When overhead bins 104 are removed from aircraft cabin 100, liner 106 is visible to occupants of the cabin. In some embodiments, liner 106 provides a finished and aesthetically pleasing appearance within the interior of aircraft cabin 100. In some embodiments, liner 106 comprises wood paneling, veneers, leather, fabric, carpet, vinyl, or any combination thereof.

Typical aircraft cabins are unfinished behind any overhead stowage, thereby presenting an unpleasing appearance when exposed. However, because liner 106 presents a finished interior, overhead bins 104 may be removed without detracting from the aesthetics of aircraft cabin 100. As such, overhead bins 104 may be removed to reduce weight and/or to alter the aircraft configuration without detracting from the passenger experience.

Figure 2:
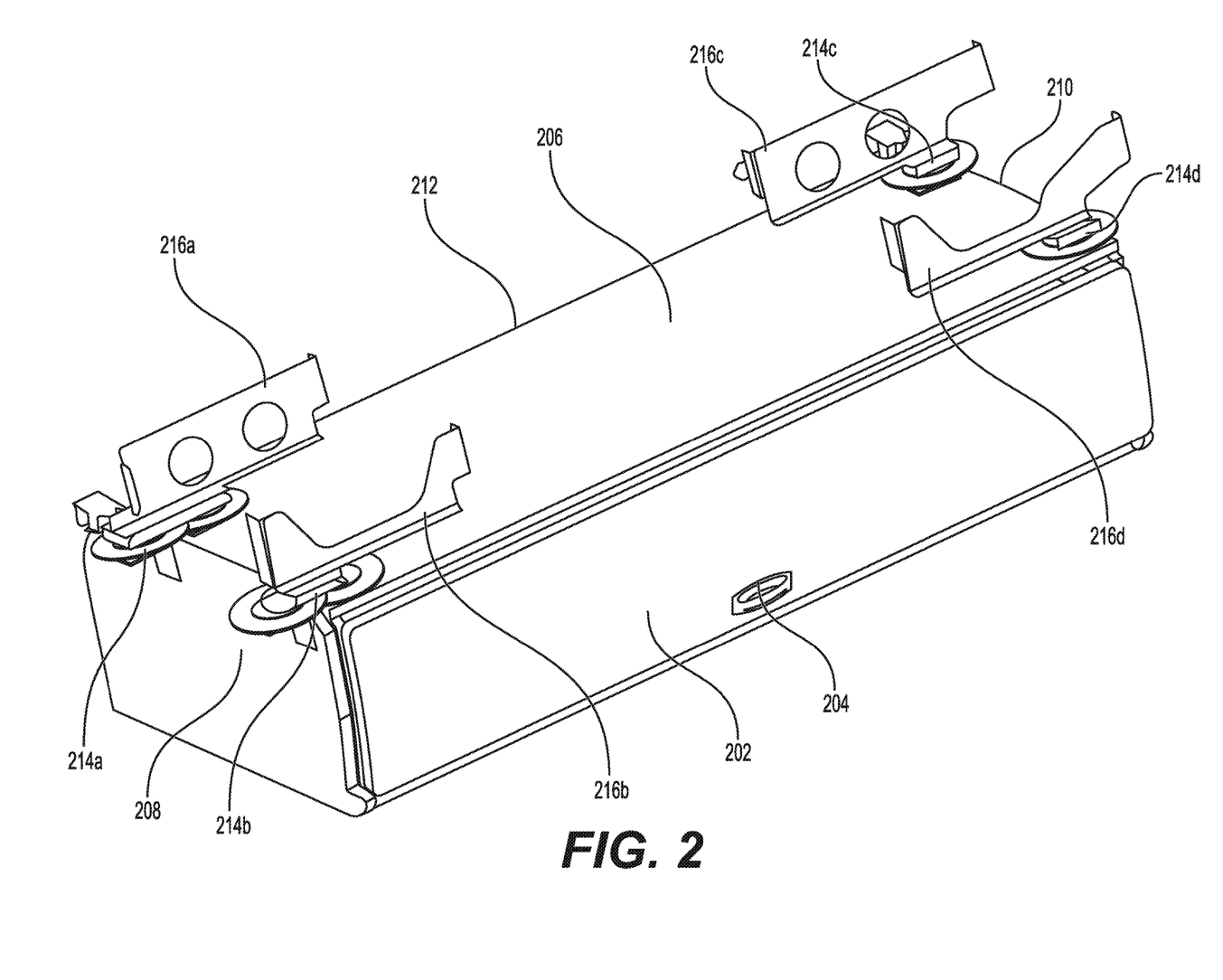
FIG. 2 illustrates an overhead bin for some embodiments.

FIG. 2 illustrates overhead bin 104 for some embodiments. Overhead bin 104 may be substantially rectangular. In some embodiments, overhead bin 104 is one of a shelf, a pivot, or a translating stowage bin. Overhead bin 104 may comprise a front face 202 comprising a handle 204 thereon. Handle 204 may be actuated by a user to open overhead bin 104, thereby exposing a cavity (not shown) in which luggage or other items may be stored. Overhead bin 104 may further comprise top face 206, left face 208, right face 210, and back face 212. Back face 212 may be disposed substantially opposite to front face 202. In some embodiments, top face 206 and back face 212 are formed from the same piece of material. In some embodiments, the transition between top face 206 and back face 212 is rounded or arcuate. Top face 206, left face 208, and right face 210 may be substantially perpendicular to front face 202 and back face 212. Left face 208 and right face 210 may be substantially opposite one another. Top face 206 may be substantially perpendicular to left face 208 and right face 210. Front face 202 may be disposed substantially opposite to back face 212.

Top face 206 may comprise a first attachment point 214a, a second attachment point 214b, a third attachment point 214c, and a fourth attachment point 214d. It should be noted that overhead bin 104 is not limited to four attachment points and may comprise any number of attachment points. As discussed below with respect to FIGS. 3A-3D, attachment points 214a, 214b, 214c, 214d may be configured for installing overhead bin 104 within aircraft cabin 100. In some embodiments, first attachment point 214a is disposed on top face 206 near left face 208 and back face 212. In some embodiments, second attachment point 214b is disposed on top face 206 near left face 208 and front face 202. In some embodiments, third attachment point 214c is disposed on top face 206 near right face 210 and back face 212. In some embodiments, fourth attachment point 214d is disposed on top face 206 near right face 210 and front face 202.

Overhead bin 104 may comprise a first bracket 216a, a second bracket 216b, a third bracket 216c, and a fourth bracket 216d installed thereon. In some embodiments, first bracket 216a corresponds to first attachment point 214a, second bracket 216b corresponds to second attachment point 214b, third bracket 216c corresponds to third attachment point 214c, and fourth bracket 216d corresponds to fourth attachment point 214d. In some embodiments, brackets 216a-d are intercostal structures configured to carry loads between aircraft structure frames. In some embodiments, brackets 216a-d are disposed above liner 106, between an interior ceiling of aircraft cabin 100 and the exterior of the aircraft body. In some embodiments, brackets 216a-d are permanently fastened to girders, frames, and/or struts in the fuselage structure via fasteners such as rivets.

In some embodiments, overhead bin 104 comprises a length from left face 208 to right face 210 of about 3 ft to about 5 ft. In some embodiments, overhead bin 104 comprises a depth from front face 202 to back face 212 of about 1 ft to about 3 ft. In some embodiments, overhead bin 104 comprises a height from a bottom face (not shown) of overhead bin 104 to top face 206 of about 0.5 ft to about 1.5 ft. In some embodiments, overhead bin 104 is fabricated from composites (e.g., honeycomb core), thermosets, thermoplastics, metals, metal alloys, or any combination thereof.

Figure 3A:
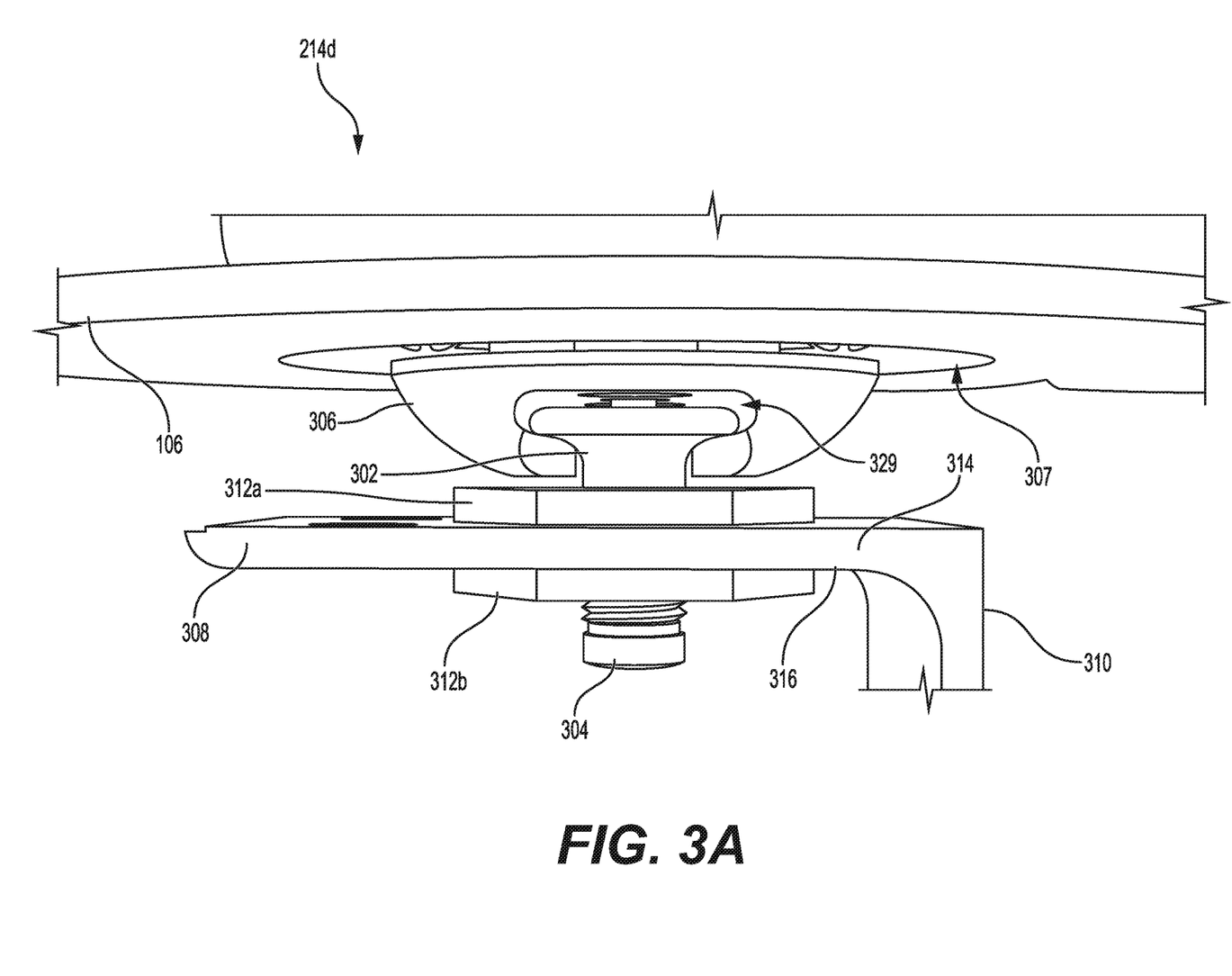
FIG. 3A illustrates an attaching mechanism for installing the overhead bin into the aircraft for some embodiments.

FIG. 3A illustrates fourth attachment point 214d for some embodiments. In some embodiments, attachment points 214a, 214b, 214c, 214d are substantially similar. In some embodiments, fourth attachment point 214d comprises a stud 302, a screw 304, and a mating receptacle 306. Stud 302 may comprise internal threads configured to receive a screw 304 therein. In some embodiments, mating receptacle 306 is mounted in liner 106 and operably connected to fourth bracket 216d as described below with respect to FIGS. 3C-3D. In some embodiments, liner 106 comprises an opening 307 for receiving mating receptacle 306 therein. Stud 302 and mating receptacle 306 used at attachment points 214a-d may be configured to carry loads applied to overhead bin 104 (e.g., the weight of bin 104 plus the weight of any items stowed therein). In some embodiments, stud 302 and mating receptacle 306 are larger than typical components used for aircraft stowage as discussed further below. In some embodiments, attachment points 214a-d are configured to carry loads of about 100-lbs.

Bracket 308 may be used to affix stud 302 and screw 304 to overhead bin 104. Bracket face 310 may abut against an inside surface of left face 208 or right face 210 of overhead bin 104 (see FIG. 3E) and be secured thereto via screws, bolts, rivets, and the like. Fourth attachment point 214d may also comprise a first nut 312a on a top face 314 of bracket 308, and a second nut 312b on a bottom face 316 of bracket 308. Bracket 308 may comprise an opening therethrough (not shown) for receiving stud 302 and screw 304.

Figure 3B:
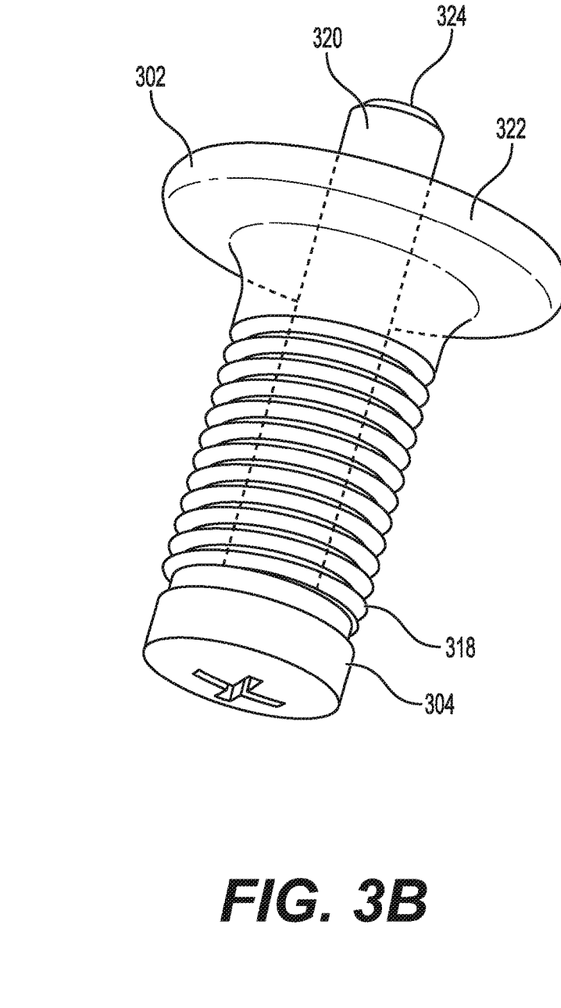
FIG. 3B illustrates a stud and a screw for the attaching mechanism for some embodiments.

FIG. 3B illustrates stud 302 and screw 304 for some embodiments with stud 302 partially transparent for clarity of illustration. As shown, screw 304 may be inserted into an opening of stud 302 at a stud distal end 318 such that only a head of screw 304 protrudes from stud distal end 318. Stud 302 may be threaded on an outer surface. A screw distal end 320 may protrude from a stud proximal end 322. Screw 304 may comprise a screw end 324 at screw distal end 320 that engages within a receptacle hole 326 (see FIG. 3C) of mating receptacle 306.

In embodiments, stud proximal end 322 provides an exposed end configured to engage with a slot 329 (see FIG. 3A and FIG. 3C) in mating receptacle 306. Specifically, stud proximal end 322 may comprise a rounded flange having a larger diameter configured for inserting within slot 329. In some embodiments, stud proximal end 322 comprises a width of about 17 mm to about 21 mm. In some embodiments, stud distal end 318 comprises a width of about 6 mm to about 10 mm. In some embodiments, stud 302 comprises a height of about 17 mm to about 21 mm.

Figure 3C:
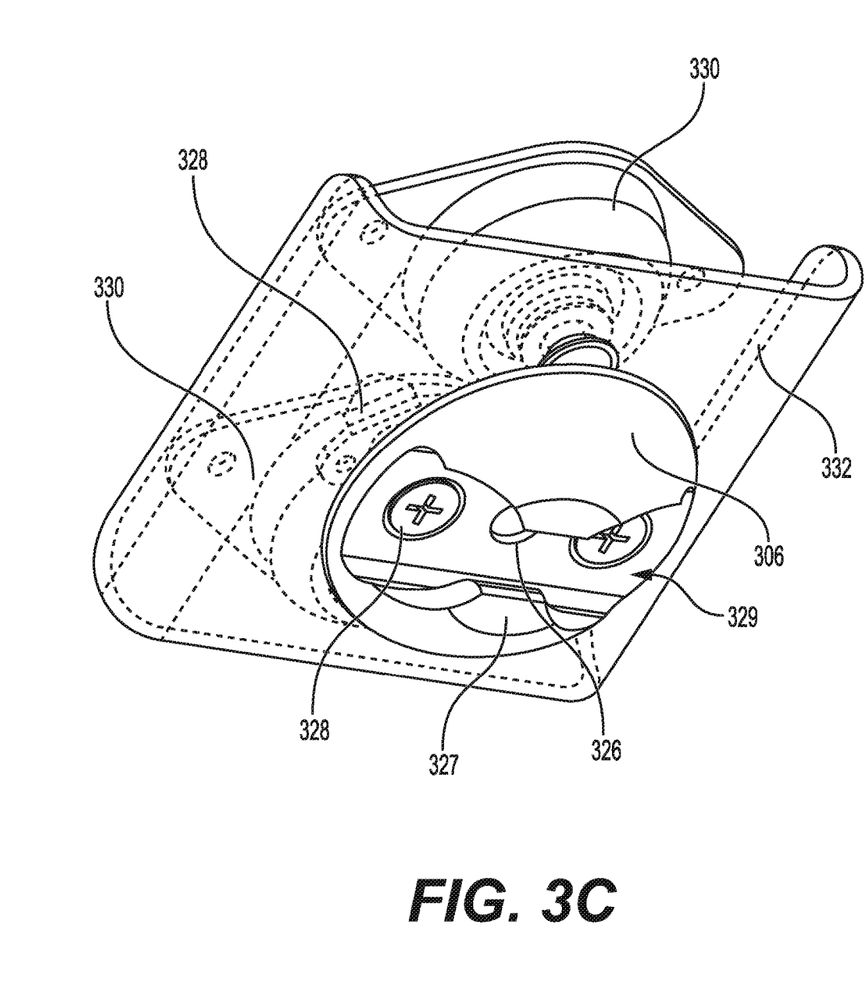
FIG. 3C illustrates a mating receptacle for the attaching mechanism for some embodiments.

FIG. 3C illustrates mating receptacle 306 for some embodiments. Portions of the assembly for mounting mating receptacle 306 and fourth bracket 216d have been omitted for clarity of illustration. As described above, mating receptacle 306 may be substantially circular or dome-shaped. In some embodiments, mating receptacle 306 comprises a width of about 40 mm to about 50 mm. In some embodiments, mating receptacle 306 comprises a height of about 8 mm to about 12 mm. In some embodiments, mating receptacle 306 is an anchor mating receptacle. In embodiments, mating receptacle 306 comprises receptacle hole 326 configured to receive screw end 324 when overhead bin 104 is installed in aircraft cabin 100, and mating receptacle 306 comprises slot 329 configured to receive stud proximal end 322, as best viewed in FIG. 3D.

Figure 3D:
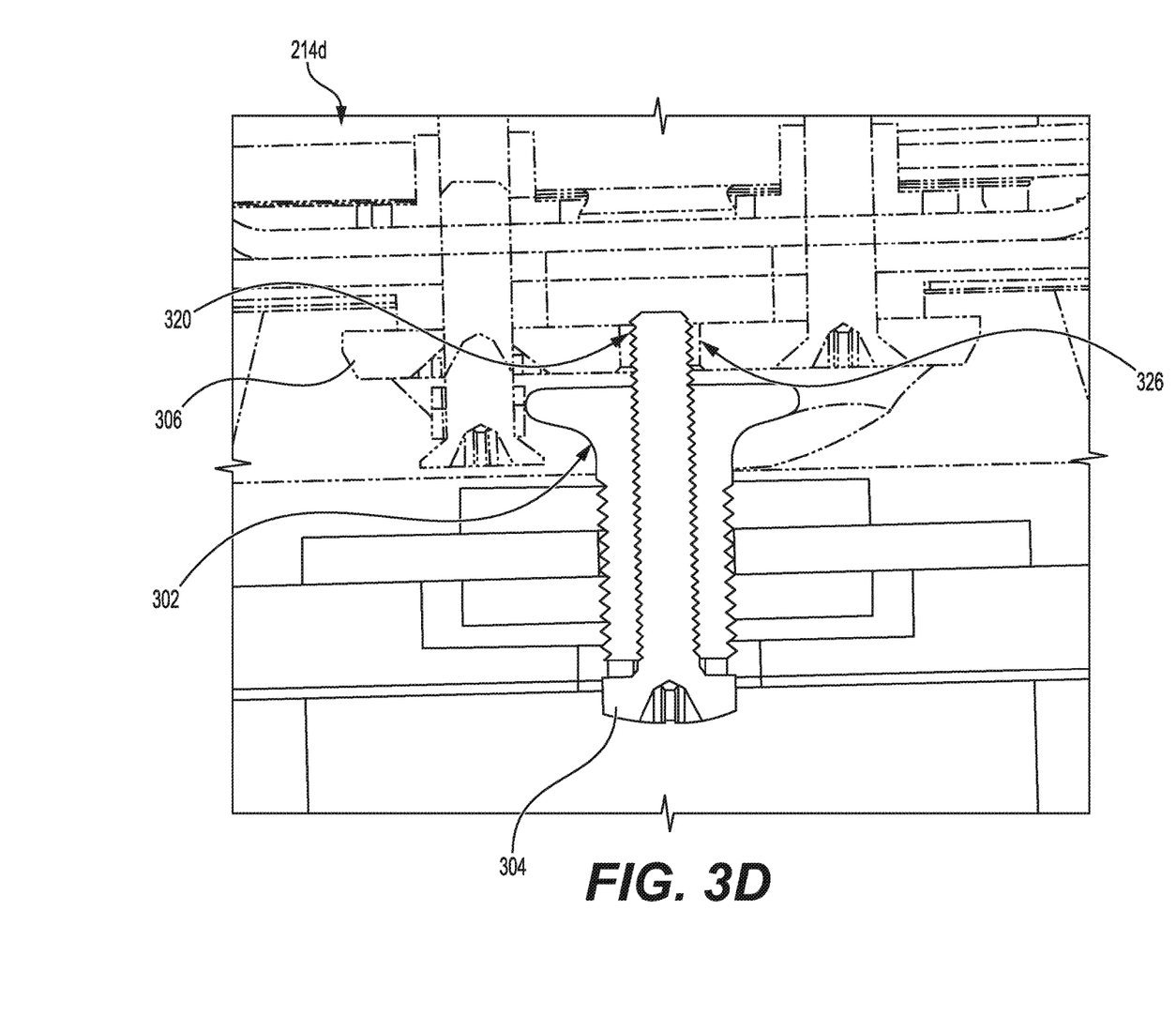
FIG. 3D provides a cross-sectional view of the mating receptacle, the stud, and the screw for some embodiments.

FIG. 3D provides a cross-sectional view of mating receptacle 306, stud 302, screw 304, and receptacle hole 326. Receptacle hole 326 is a through-hole, as depicted in FIG. 3D, but receptacle hole 326 could, in embodiments, be a shallow hole, a cut out, a scoop, or an indent configured to receive stud proximal end 322.

Returning to FIG. 3C, slot 329 may be configured with a wide opening at both ends such that mating receptacle 306 may be used on either side of the aircraft for receiving stud 302. Slot 329 may also comprise a narrow portion 327 where stud proximal end 322 is secured upon installment. Mating receptacle 306 may be mounted within liner 106 via receptacle fasteners 328. In some embodiments, fourth bracket 216d is coupled to mating receptacle 306 via bracket fasteners 330. In some embodiments, bracket fasteners 330 are configured as acoustic isolators to provide sound dampening. In some embodiments, a mounting bracket 332 is disposed above mating receptacle 306, and bracket fasteners 330 mounted thereto. Brackets 216a, 216b, 216c may be connected to attachment points 214a, 214b, 214c in a substantially similar manner as described above with respect to fourth bracket 216d.

In operation, turning of screw 304 is used engage stud 302 within mating receptacle 306. For example, turning of screw 304 in a first direction engages the screw end 324 into receptacle hole 326 and the rounded flange of stud proximal end 322 is tightened within the narrow portion of slot 329. The head of screw 304 is tightened securing it against stud 302. In some embodiments, screw 304 is partially engaged upon installment of overhead bin 104. As such, when overhead bin 104 is installed, an installer simply has to fully engage screw 304 (e.g., with a screwdriver), thereby tightening fourth attachment point 214d into place. Screw 304 may be fully engaged by hand, with a screwdriver, with a hex driver, or with a drill, for example. Turning of screw 304 in a second direction opposite the first direction loosens screw 304 thereby decreasing tension against stud 302, then disengages screw 304 from hole 326 enabling its removal therefrom.

Figure 3E:
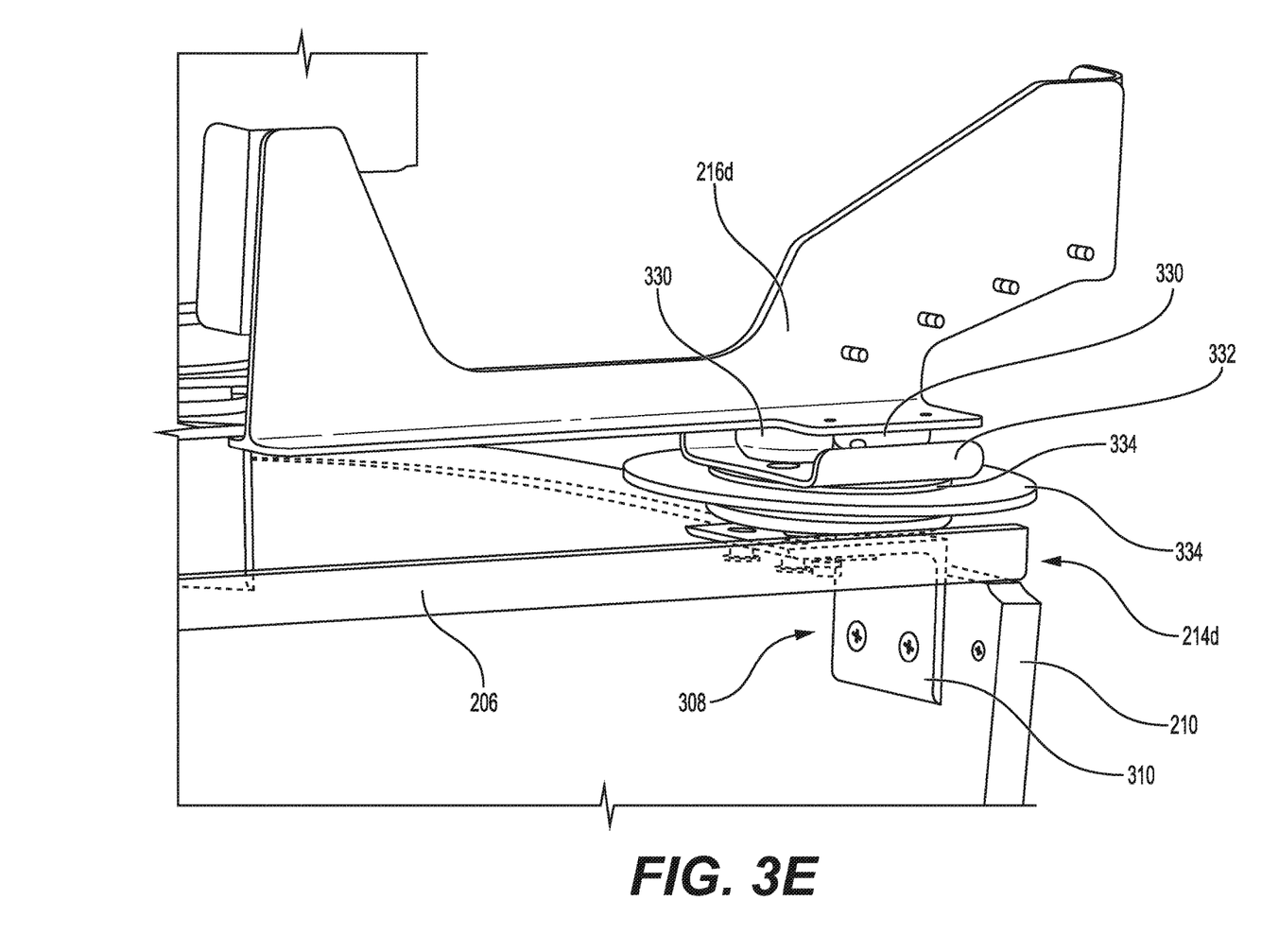
FIG. 3E illustrates a close-up view of the attaching mechanism and the overhead bin for some embodiments.

FIG. 3E illustrates a close-up view of fourth attachment point 214d for some embodiments. For clarity of illustration, top face 206 is illustrated semi-transparently, and liner 106 and front face 202 have been omitted from FIG. 3E. As described above, bracket face 310 may abut against the inside surface of right face 210 and may be secured thereto. Similarly, for first attachment point 214a and second attachment point 214b, bracket face 310 may abut against the inside surface of left face 208 and may be secured there to. Top face 206 may comprise an opening therethrough (not shown) through which bracket 308 may be inserted such that bottom face 316 abuts against top face 206 as shown. Also illustrated in FIG. 3E are bracket fasteners 330 for connecting fourth bracket 216d to fourth attachment point 214d. In some embodiments, bracket fasteners 330 comprise any combination of washers, brackets, nuts, screws, or bolts. As shown, bracket fasteners 330 may abut against mounting bracket 332. Washers 334 may also be present for connecting mating receptacle 306 and fourth bracket 216d in overhead bin 104. In some embodiments, washers 334 are disposed between fourth bracket 216d and mating receptacle 306. In some embodiments, washers 334 are configured to close out visibility from aircraft cabin 100 to the rest of the aircraft structure. In some embodiments, washers 334 comprise plastic and black fabric (e.g., a plastic washer with a black fabric exterior).

Figure 4:
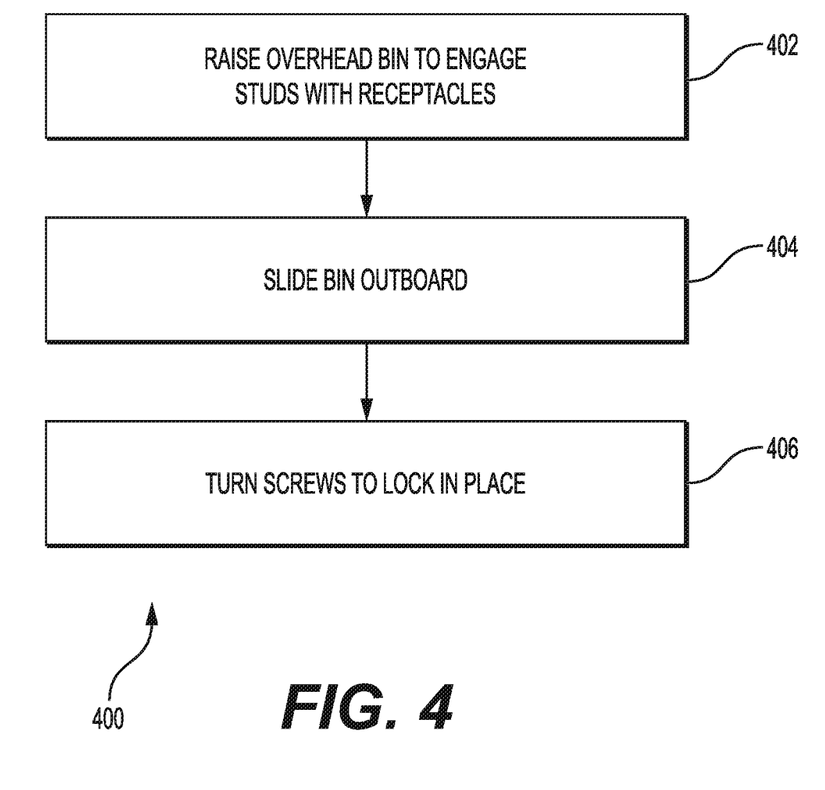
FIG. 4 illustrates an exemplary method for installing the overhead bin in an aircraft for some embodiments.

FIG. 4 illustrates an exemplary method 400 for installation of overhead bin 104 for some embodiments. At step 402, overhead bin 104 may be raised to engage studs 302 to mating receptacles 306. Once raised, at step 404, overhead bin 104 may be slid outboard to fully engage attachment points 214a, 214b, 214c, 214d. Next, at step 406, screws 304 may be turned to lock attachment points 214a, 214b, 214c, 214d. In some embodiments, turning screws 304 causes screw end 324 to insert into receptacle hole 326 while also rotating stud proximal end 322 downward to press against narrow portion 327 in slot 329 (see FIGS. 3A-3C). In some embodiments, screws 304 are partially engaged such that only a substantially small turn is required to fully lock overhead bin 104.

To remove overhead bin 104, the reverse process outlined in method 400 may be followed. Screws 304 may be turned and unlocked from mating receptacles 306 whereby 302 is loosened (e.g., screw distal end 320 is no longer engaged in hole 326). Overhead bin 104 may then be slid inboard to disengage studs 302 from mating receptacles 306. Thereafter, overhead bin 104 may be lowered. As described above, attachment points 214a, 214b, 214c, 214d allow for the quick installation and removal of overhead bins 104 from aircraft cabin 100. Therefore, the aircraft may be easily configured for different uses, and overhead bins 104 may be removed to save weight and space. As described above, the aircraft may be operated with overhead bins 104 removed, and the finished liner 106 provides the appearance that no components are missing from the aircraft.

While embodiments herein have been described with respect to overhead bins 104 and attachment points 214a, 214b, 214c, 214d used in aircraft, overhead bins 104 may be used in other situations. Overhead bin 104 may be configured for use on a boat or train, for example. As another example, overhead bin 104 may be used within houses, offices, workshops, and the like. Attachments points 214a, 214b, 214c, 214d may be used in various situations requiring the attachment of an easily removable component.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An installment system for an overhead bin in an aircraft, comprising:
   a receptacle mechanically coupled to a structure above a cabin ceiling of the aircraft via a bracket, wherein the receptacle protrudes through an opening in a liner disposed on an underside of the cabin ceiling; and
   a bin having a top side with at least one attachment point, the at least one attachment point comprising:
      a stud mechanically coupled to the top side; and
      a screw disposed within the stud,
      wherein the stud comprises a rounded flange configured to insert into the receptacle for removably securing the bin beneath the liner.

2. The system of claim 1, wherein the receptacle comprises a slot having wide openings at opposing ends and a narrow portion therebetween, wherein the stud is configured for insertion of the rounded flange into the slot via one of the wide openings and for inserting the rounded flange into the narrow portion.

3. The system of claim 2, wherein the receptacle comprises:
   a hole above the slot facing downward at the narrow portion; and
   an end of the screw is configured to engage the hole when the bin is installed.

4. The system of claim 1, wherein the stud comprises internal threads configured to receive the screw.

5. The system of claim 4, wherein the screw is configured to be turned within the internal threads for engaging of the rounded flange within the receptacle.

6. The system of claim 5, wherein the screw is configured to be turned via a screwdriver.

7. An installation method for an overhead bin in an aircraft, wherein the overhead bin comprises at least one stud on a top side of the overhead bin and a ceiling of the aircraft comprises at least one receptacle, the installation method comprising:
   raising the overhead bin to engage the at least one stud with the at least one receptacle;
   sliding the overhead bin in an outboard direction for inserting the at least one stud into a narrow portion of the at least one receptacle; and
   turning a screw disposed within the at least one stud in a first direction for engaging within the at least one receptacle, thereby securing the overhead bin beneath the ceiling.

8. The method of claim 7, comprising turning the screw disposed within the at least one stud in a second direction opposite the first direction for disengaging within the at least one receptacle, thereby releasing the overhead bin for removal from the ceiling.

9. The method of claim 7, comprising configuring the aircraft for providing storage for an individual trip by installing one or more overhead bins.

10. The method of claim 7, comprising configuring the aircraft for reducing weight and increasing overhead cabin space for an individual trip by removing one or more overhead bins.

11. A removable bin installment system for use in an aircraft, comprising:
   a plurality of brackets mounted to an overhead structure above a ceiling in the aircraft, wherein an underside of the ceiling comprises a liner having a finished surface;
   a plurality of receptacles each mechanically coupled to a respective one of the brackets, wherein the liner comprises a plurality of openings configured to each receive a respective one of the receptacles for protruding through the liner; and
   a removable bin having a top side with a plurality of attachment points, each of the attachment points comprising:
      a stud mechanically coupled to the top side, wherein the stud comprises an exposed end having a larger diameter configured for inserting into a respective one of the receptacles; and
      a screw disposed within the stud, wherein the screw is configured for turning thereby tightening the stud within the receptacle for removably securing the removable bin beneath the ceiling.

12. The removable bin installment system of claim 11, wherein the receptacles each comprise: a slot having a wide opening configured for receiving the exposed end of the stud; and a narrow portion configured for securing the exposed end of the stud thereto.

13. The removable bin installment system of claim 12, wherein the receptacles each comprise a hole above the slot in the narrow portion such that an end of the screw is configured for engaging the hole when the removable bin is installed.

14. The removable bin installment system of claim 13, wherein the screw is coupled with the stud via threads such that tightening of the screw is configured to secure the removable bin or loosening of the screw is configured to unsecure the removable bin.

\* \* \* \* \*